(12) United States Patent
Noguchi et al.

(10) Patent No.: US 7,373,147 B2
(45) Date of Patent: May 13, 2008

(54) MOBILE COMMUNICATION METHOD AND MOBILE STATION

(75) Inventors: Katsuhiro Noguchi, Yokohama (JP); Kazuyuki Kozu, Yokosuka (JP); Kota Fujimura, Yokosuka (JP); Takashi Suzuki, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 83 days.

(21) Appl. No.: 11/094,184

(22) Filed: Mar. 31, 2005

(65) Prior Publication Data

US 2005/0221823 A1  Oct. 6, 2005

(30) Foreign Application Priority Data

Mar. 31, 2004 (JP) ............................. 2004-107842

(51) Int. Cl.
*H04Q 7/20* (2006.01)
(52) U.S. Cl. ............... 455/435.1; 455/435.2; 455/550.1
(58) Field of Classification Search .......... 455/435.1, 455/560, 435.2, 433, 453.1, 550.1
See application file for complete search history.

(56) References Cited

U.S. PATENT DOCUMENTS

| | | | |
|---|---|---|---|
| 6,463,286 B1* | 10/2002 | Salminen ................. | 455/453 |
| 6,922,728 B2* | 7/2005 | Cho ........................ | 709/227 |
| 6,944,462 B2* | 9/2005 | Riihinen et al. .......... | 455/453 |
| 6,961,588 B2* | 11/2005 | Watanabe ................ | 455/560 |
| 2003/0028644 A1* | 2/2003 | Maguire et al. ......... | 709/226 |
| 2003/0050078 A1* | 3/2003 | Motegi et al. .......... | 455/456 |
| 2004/0072578 A1* | 4/2004 | Keutmann et al. ....... | 455/456.1 |
| 2004/0185869 A1* | 9/2004 | Lee et al. ............... | 455/456.1 |
| 2005/0075129 A1* | 4/2005 | Kuchibhotla et al. .... | 455/552.1 |

FOREIGN PATENT DOCUMENTS

| | | |
|---|---|---|
| GB | 2 381 164 A | 4/2003 |
| WO | WO 00/18171 | 3/2000 |
| WO | WO 00/31995 | 6/2000 |
| WO | WO 02/01907 A1 | 1/2002 |

(Continued)

OTHER PUBLICATIONS

"3GPP TS 23.060 V6.8.O", 3rd Generation Partnership Project: Technical Specification Group Services and System Aspects; General Packet Radio Service (GPRS); Service description; Stage 2 (Release 6), Mar. 2005, pp. 1-212.

(Continued)

*Primary Examiner*—CongVan Tran
(74) *Attorney, Agent, or Firm*—Oblon, Spivak, McClelland, Maier & Neustadt, P.C.

(57) ABSTRACT

A mobile station is configured to transmit a first location registration related signal addressed to a first exchange to a radio network controller, so as to perform location registration to both the first exchange and a second exchange, when operating in first network operation mode. The mobile station includes a controller configured to transmit a second location registration related signal addressed to the second exchange to the radio network controller, so as to perform the location registration to the second exchange without passing thorough the first exchange, when the mobile station operates in the first network operation mode and when the mobile station receives an access restriction signal for the first exchange from the radio network controller.

6 Claims, 5 Drawing Sheets

FOREIGN PATENT DOCUMENTS

WO     WO 02/065800 A1     8/2002
WO     WO 03/100647 A1     12/2003

OTHER PUBLICATIONS

"3GPP TS 23.122 V7.0.0", 3rd Generation Partnership Project: Technical Specification Group Core Network; NAS Functions related to Mobile Station (MS) in idle mode (Release 7), Jan. 2005, pp. 1-34.

"3GPP TS 24.008 V6.7.0", 3rd Generation Partnership Project; Technical Specification Group Core Network; Mobile radio interface Layer 3 specification; Core network protocols; Stage 3 (Release 6), Jan. 2005, pp. 1-507.

"3GPP TS 25.331 V6.2.0", 3RD Generation Partnership Project, Jun. 2004, pp. 1-1036.

* cited by examiner

NETWORK OPERATION MODE: I

| DOMAIN UNDER ACCESS CONTROL | TRANSMITTABLE SIGNALS |
|---|---|
| PS | NORMAL LOCATION UPDATE<br>IMSI ATTACH, IMSI DETACH<br>CS-SMS |
| CS | NORMAL ROUTING AREA UPDATE<br>GPRS ATTACH, GPRS DETACH<br>PS-SMS |
| NONE | COMBINED ROUTING UPDATE<br>COMBINED ATTACH, COMBINE DETACH<br>CS/PS-SMS |
| PS/CS | NONE |

MOBILE COMMUNICATION METHOD AND MOBILE STATION

CROSS REFERENCE TO RELATED APPLICATION

This application is based upon and claims the benefit of priority from the prior Japanese Patent Application No. P2004-107842, filed on Mar. 31, 2004; the entire contents of which are incorporated herein by reference.

BACKGROUND OF THE INVENTION

1. Field of the Invention

The present invention relates to a mobile communication method for transmitting a first location registration related signal addressed to the first exchange to a radio network controller, so as to perform location registration to a first exchange and a second exchange, in the case where a mobile station operates in a "Network Operation Mode I".

Also, the present invention relates to a mobile station which can be used in the mobile communication method.

2. Description of the Related Art

Conventionally, a mobile communication system, which provides a "Domain Combined Mobility Management (MM) procedure", is known. This type of mobile communication system will be described by referring to FIGS. 1A and 1B.

Figure 1A:
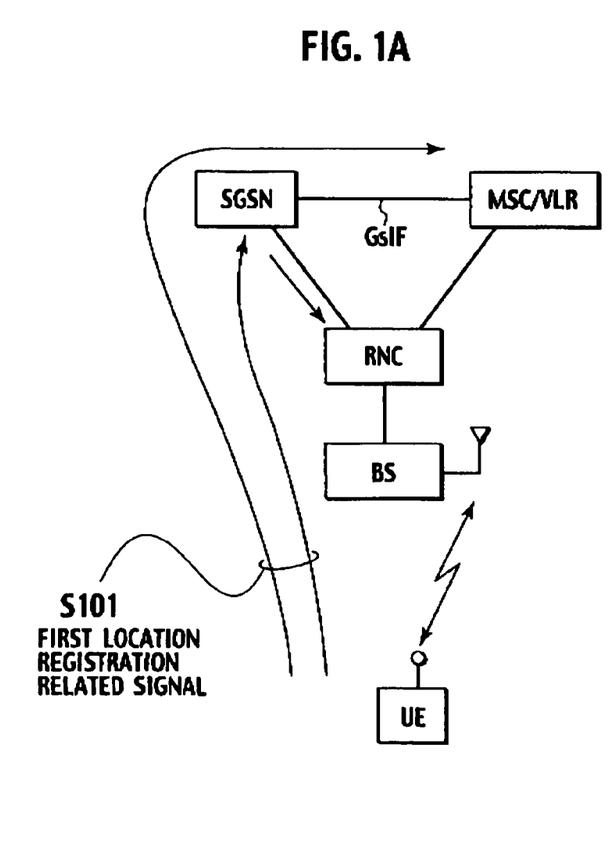
FIGS. 1A and 1B are views of an entire configuration and an operation of a conventional mobile communication system.
Figure 1B:
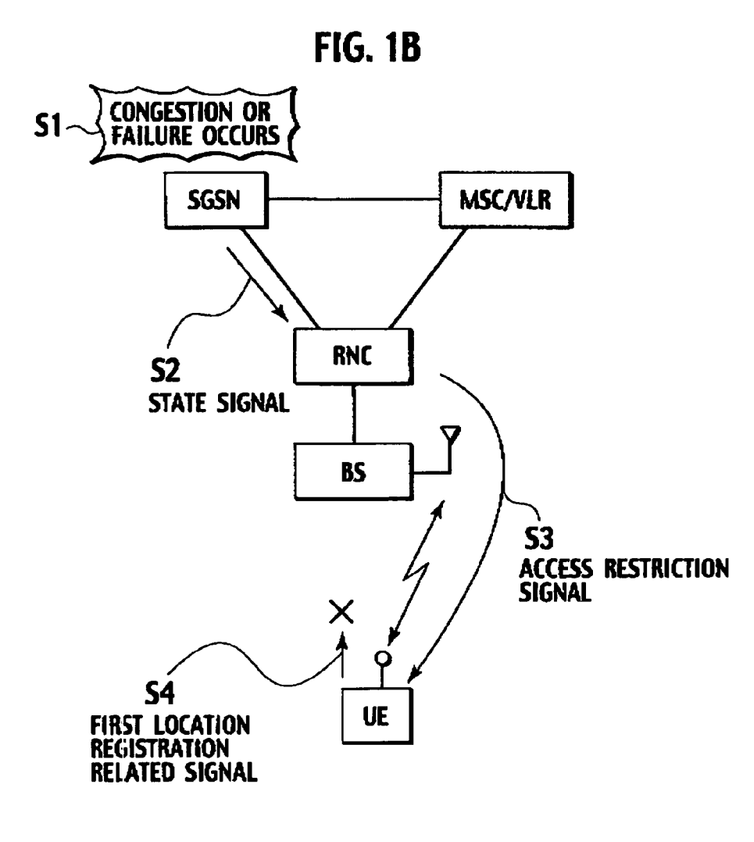

In the mobile communication system, a radio network controller RNC is configured to notify a network operation mode to a mobile station UE via a base station BS.

Here, the network operation mode indicates a method of performing the location registration to an exchange for a packet switched service (first exchange) SGSN (serving GPRS support node) and an exchange for a circuit switched service (second exchange) MSC/VLR (mobile service switching center/visitor location register).

When operating in the Network Operation Mode I, as shown in FIG. 1A, the mobile station UE is configured to transmit a first location registration related signal addressed to the SGSN to the radio network controller RNC via the base station BS, so as to perform the location registration to both the SGSN and the MSC/VLR.

To be more specific, first, the radio network controller RNC transfers the first location registration related signal transmitted from the mobile station UE via the base station BS, to the SGSN.

Second, the SGSN performs the location registration of the mobile station UE in use of the first location registration related signal transferred from the radio network controller RNC, and transfers the first location registration related signal to the MSC/VLR via GsIF.

Third, the MSC/VLR performs the location registration of the mobile station UE in use of the first location registration related signal transferred from the SGSN.

In this case, the mobile station UE can perform the location registration to both the SGSN and the MSC/VLR, only by transmitting the first location registration related signal addressed to the SGSN.

Therefore, the mobile station UE does not need to transmit the first and second location registration related signals separately to the SGSN and the MSC/VLR, so that the traffic in the radio communication area can be reduced.

In the above described mobile communication system, the mobile station UE is configured to transmit one of the first service related signal addressed to the SGSN or a second service related signal addressed to the MSC/VLR to the radio network controller RNC, so as to use predetermined services such as a short message service or a global positioning service.

However, in the mobile communication system providing the conventional "Domain Combined MM procedure", the mobile station UE which operates in the Network Operation Mode I cannot perform the location registration to either the SGSN or the MSC/VLR, when congestion or failure occurs in the SGSN.

To be more specific, as shown in FIG. 1B, when congestion or failure occurs in the SGSN in step S1, the SGSN transmits a state signal to the radio network controller RNC in order to notify the occurrence of the congestion or the failure in step S2.

In step S3, the radio network controller RNC broadcasts an access restriction signal which restricts accesses to the SGSN (a packet switched service domain).

In step S4, the mobile station UE stops transmitting the location registration related signals to the SGSN in accordance with the received access restriction signal.

When operating in the Network Operation Mode I, the mobile station UE performs the location registration to the MSC/VLR by using the first location registration related signal addressed to the SGSN. Therefore, in this case, the mobile station UE cannot perform the location registration to the MSC/VLR (circuit switched service domain) which is originally available.

Further, in the above described mobile communication system, there is a problem in that the mobile station UE, which has received the access restriction signal when the congestion or the failure in the SGSN occurs, cannot use predetermined services provided by the MSC/VLR, by automatically switching to transmit the second service related signal addressed to the MSC/VLR to the radio network controller RNC.

BRIEF SUMMARY OF THE INVENTION

The present invention has been made in view of the above problems, and has an object of providing a mobile communication system in which a mobile station UE operating in the Network Operation Mode I can perform the location registration or service related process to the originally available MSC/VLR when congestion or failure occurs in the SGSN. Also, the present invention has an object of providing a mobile station UE which can be used in the mobile communication system.

A first aspect of the present invention is summarized as a mobile station configured to transmit a first location registration related signal addressed to a first exchange to a radio network controller, so as to perform location registration to both the first exchange and a second exchange, when operating in first network operation mode. The mobile station includes a controller configured to transmit a second location registration related signal addressed to the second exchange to the radio network controller, so as to perform the location registration to the second exchange without passing thorough the first exchange, when the mobile station operates in the first network operation mode and when the mobile station receives an access restriction signal for the first exchange from the radio network controller.

In the first aspect, the controller can be configured to transmit the first location registration related signal addressed to the first exchange to the radio network controller, so as to perform the location registration to both the first exchange and the second exchange, when the mobile station operates in the first network operation mode and when the mobile station receives an access restriction release signal for the first exchange from the radio network controller.

In the first aspect, the first exchange can be an exchange for a packet switched service; the second exchange can be an exchange for a circuit switched service; the first location registration related signal can include at least one of a location registration update signal for both services, an attach signal for both services, or a detach signal for both services; and the second location registration related signal can include at least one of a location registration update signal for the circuit switched service, an attach signal for the circuit switched service, or a detach signal for the circuit switched service.

A second aspect of the present invention is summarized as a mobile station configured to transmit a first service related signal addressed to a first exchange or a second service related signal addressed to a second exchange to a radio network controller so as to use a predetermined service. The mobile station includes a controller configured to transmit the service related signal addressed to an exchange, which is different from an exchange notified by an access restriction signal received from the radio network controller, to the radio network controller, so as to use the predetermined service.

A third aspect of the present invention is summarized as a mobile communication method for transmitting a first location registration related signal addressed to a first exchange to a radio network controller, so as to perform location registration to both the first exchange and a second exchange, when the mobile station operates in a first network operation mode. The mobile communication method includes; starting, at the mobile station, to operate in the first network operation mode in accordance with a notification signal from the radio network controller; broadcasting, at the radio network controller, an access restriction signal for the first exchange to the mobile station, when detecting failure or congestion in the first exchange; and transmitting, at the mobile station, a second location registration related signal addressed to the second exchange to the radio network controller in accordance with the access restriction signal for the first exchange, so as to perform the location registration to the second exchange without passing through the first exchange.

In the third aspect, the mobile communication method can further includes: broadcasting, at the radio network controller, an access restriction release signal for the first exchange to the mobile station, when detecting a recovery of failure or congestion in the first exchange; and transmitting, at the mobile station, the first location registration related signal addressed to the first exchange to the radio network controller in accordance with the access restriction release signal for the first exchange, so as to perform the location registration to both the first exchange and the second exchange.

DETAILED DESCRIPTION OF THE INVENTION

Configuration of a Mobile Communication System According to An Embodiment of the Present Invention Referring to FIGS. 2 to 4, a mobile communication system according to an embodiment of the present invention will be described. The entire configuration of the mobile communication system according to the present invention is mostly the same as the entire configuration of the conventional mobile communication system shown in FIGS. 1A and 1B.

The configuration of the mobile communication system according to the present embodiment will be explained, focusing on the difference from the configuration of the conventional mobile communication system.

According to the present embodiment, when operating in the Network Operation Mode I, the mobile station UE is configured to transmit the first location registration related signal which is addressed to the SGSN (first exchange) to the radio network controller RNC, so as to perform the location registration to both the SGSN and the MSC/VLR (second exchange).

Here, the "SGSN" indicates an exchange for a packet switched service, and the "MSC/VLR" indicates an exchange for a circuit switched service.

When operating in the Network Operation Mode II, the mobile station UE is configured to transmit the second location registration related signal addressed to the MSC/VLR and a third location registration related signal addressed to the SGSN separately to the radio network controller RNC via a base station BS, so as to perform the location registration to both the SGSN and the MSC/VLR.

The first location registration related signal includes a location registration update signal for both the circuit switched service and the packet switched service (Combined Routing Update), an attach signal for both the circuit switched service and the packet switched service (Combined attach), a detach signal for both the circuit switched service and the packet switched service (Combined detach) or the like.

The second location registration related signal includes a location registration update signal for the circuit switched service (Normal Location Update), an attach signal for the circuit switched service (IMSI attach), a detach signal for the circuit switched service (IMSI detach) or the like.

The third location registration related signal includes a location registration update signal for the packet switched service (Normal Routing Area Update), an attach signal for the packet switched service (GPRS attach), a detach signal for the packet switched service (GPRS detach) or the like.

The mobile station UE according to the present embodiment is configured to transmit one of either the first service related signal addressed to the SGSN or the second service related signal addressed to the MSC/VLR, to the radio network controller RNC, so as to use predetermined services such as a short message service and a global positioning service.

The first service related signal includes a short message related signal (PS-SMS) for a packet switched service, a location search related signal for a packet switched service, or the like.

The second service related signal includes a short message related signal (CS-SMS) for a circuit switched service, a location search related signal for a circuit switched service, or the like.

Figure 2:
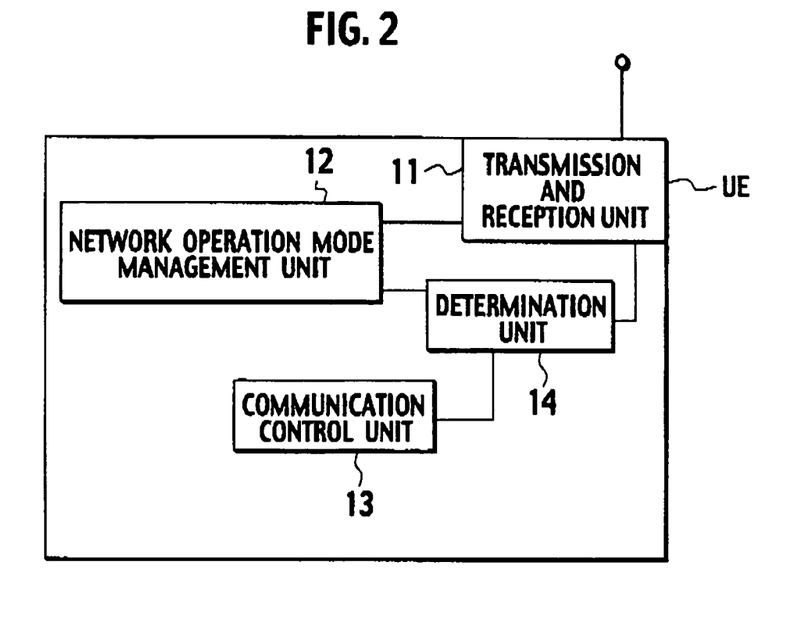
FIG. 2 is a functional block diagram of a mobile station according to an embodiment of the present invention.

As shown in FIG. 2, the mobile station UE includes a transmission and reception unit 11, a network operation mode management unit 12, a communication control unit 13, and a determination unit 14.

The transmission and reception unit 11 is configured to set a radio channel with the base station BS, to transmit signals such as a location registration related signal to the radio network controller RNC via the radio channel, and to receive signals such as an access restriction signal from the radio network controller RNC.

The network operation mode management unit 12 is configured to manage whether the mobile station UE operates in the Network Operation Mode I or the Network Operation Mode II.

The network operation mode management unit 12 is configured to switch the network operation mode for the operation, in accordance with network operation mode information which is notified by a notification signal from the radio network controller RNC.

The communication control unit 13 is configured to perform necessary controls on communications for a packet switched service and a circuit switched service.

For example, the communication control unit 13 is configured to determine to perform the location registration to the SGSN and the MSC/VLR, in such cases where the power is turned on or turned off, or where a location area of the mobile station UE is changed.

The determination unit 14 is configured to generate the location registration related signal which is transmitted to the radio network controller RNC, in accordance with an instruction from the communication control unit 13.

The type of the generated location registration related signal changes depending on the current network operation mode of the mobile station UE, the presence or absence of an access restriction signal from the radio network controller RNC or an access restriction release signal, or the exchange of the location registration which is determined by the communication control unit 13.

For example, in the case where the mobile station UE operates in the Network Operation Mode II and the exchange of the location registration which is determined by the communication control unit 13 is the MSC/VLR, the determination unit 14 generates a second location registration related signal addressed to the MSC/VLR.

However, in the case where an access restriction signal for the MSC/VLR is received from the radio network controller RNC (and an access restriction release signal for the MSC/VLR is not received), the determination unit 14 determines not to transmit the second location registration related signal.

In the case where the mobile station UE operates in the Network Operation Mode II and where the exchange of the location registration which is determined by the communication control unit 13 is the SGSN, the determination unit 14 generates a third location registration related signal addressed to the SGSN.

However, in the case where an access restriction signal for the SGSN is received from the radio network controller RNC (and an access restriction release signal for the SGSN is not received), the determination unit 14 determines not to transmit the third location registration related signal.

Figure 3:
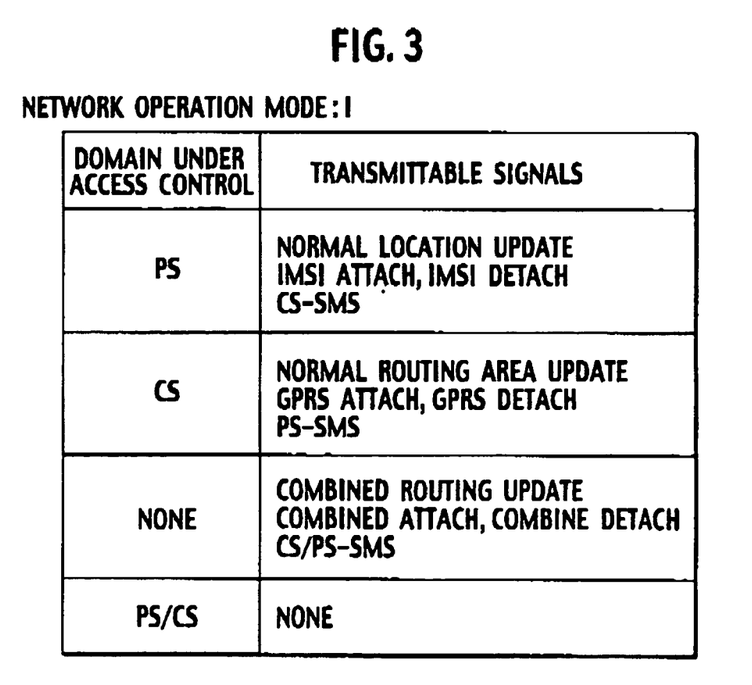
FIG. 3 is an example of a table managed by a determination unit of the mobile station according to the embodiment of the present invention.

On the other hand, in the case where the mobile station UE operates in the Network Operation Mode I, the determination unit 14 refers to a table shown in FIG. 3, and determines the type of the location registration related signal to be generated. As shown in FIG. 3, the table stores a domain under the access restriction in association with signals which can be transmitted to the domain.

In other words, as shown in FIG. 3, in the case where the exchange of the location registration which is determined by the communication control unit 13 is the MSC/VLR and where an access restriction signal for the SGSN is received from the radio network controller RNC (and an access restriction release signal for the SGSN is not received), the determination unit 14 generates a second location registration related signal addressed to the MSC/VLR and transmits the second location registration related signal to the radio network controller RNC. As a result, the location registration process can be performed to the MSC/VLR without passing through the SGSN.

Then, when the access restriction release signal for the SGSN is received, the determination unit 14 changes to transmit the first location registration related signal addressed to the SGSN to the radio network controller RNC.

In the case where the exchange of the location registration which is determined by the communication control unit 13 is the SGSN, and where an access restriction signal for the MSC/VLR is received from the radio network controller RNC (and an access restriction release signal for the MSC/VLR is not received), the determination unit 14 generates a third location registration related signal addressed to the SGSN and transmits the third location registration related signal to the radio network controller RNC. As a result, the location registration to the SGSN is performed.

Then, in the case where an access restriction release signal for the SGSN is received, the determination unit 14 changes to transmit the first location registration related signal addressed to the SGSN to the radio network controller RNC.

In the case where any access restriction signal is not received from the radio network controller RNC (or an access restriction release signal is received), the determination unit 14 generates a first location registration related signal addressed to the SGSN and transmits the first location registration related signal to the radio network controller RNC, regardless of whether the determined exchange is the SGSN or the MSC/VLR.

In the case where access restriction signals for both exchanges are received from the radio network controller RNC (or any access restriction release signal is not received), the determination unit 14 determines not to transmit any location registration related signal to the radio network controller RNC, because there is no signal to be transmitted.

The determination unit 14 is configured to transmit a first service related signal addressed to the first exchange or a second service related signal addressed to the second exchange to the radio network controller RNC, when using predetermined services such as a short message service or a global positioning service.

In the case where an access restriction signal is received from the radio network controller RNC, the determination unit 14 is configured to transmit a service related signal (e.g. a second service related signal) addressed to a different exchange (e.g. the MSC/VLR) from the exchange (e.g. the SGSN) which is notified from the access restriction signal, to the radio network controller RNC.

Figure 4:
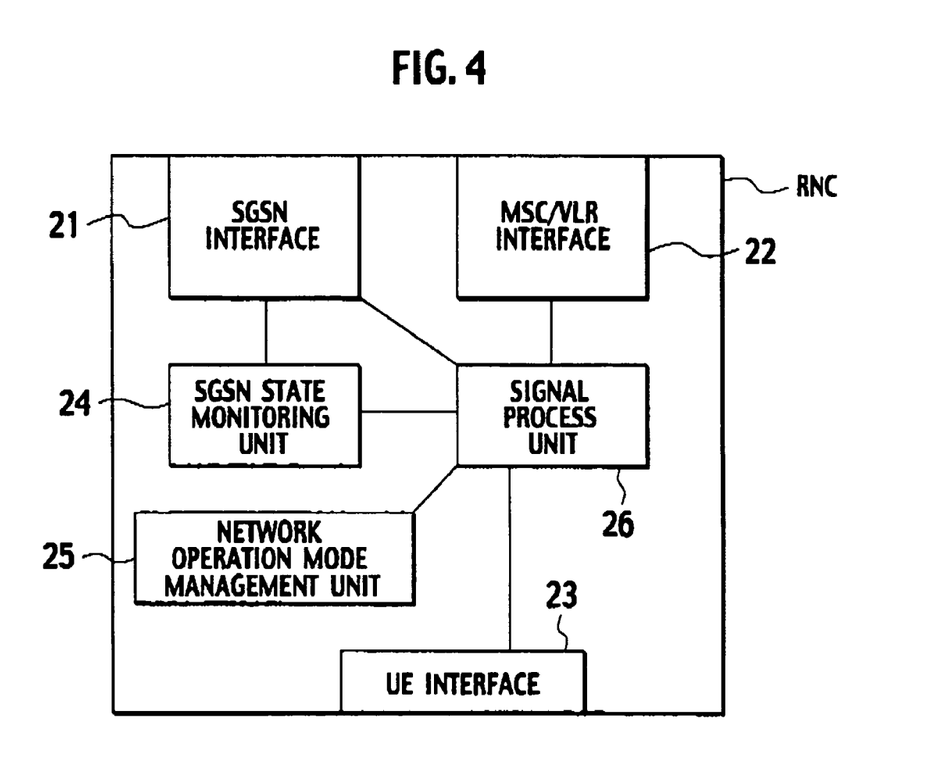
FIG. 4 is a functional block diagram of a radio network controller according to the embodiment of the present invention.

As shown in FIG. 4, the radio network controller RNC includes an SGSN interface 21, an MSC/VLR interface 22, a UE interface 23, an SGSN state monitoring unit 24, a network operation mode management unit 25, and a signal process unit 26.

The SGSN interface 21 is an interface for communication with the SGSN. The MSC/VLR interface 22 is an interface for communication with the MSC/VLR. The UE interface 23 is an interface for communication with the mobile station UE.

The SGSN state monitoring unit 24 is configured to monitor the state of the SGSN. For example, the SGSN state monitoring unit 24 is configured to detect that the failure occurs in the SGSN or the load of the SGSN crosses a predetermined threshold, in accordance with a state signal transmitted from the SGSN.

The SGSN state monitoring unit 24 is configured to detect that the failure is recovered in the SGSN or the load of the SGSN become smaller than the predetermined threshold, in accordance with the state signal transmitted from the SGSN.

The network operation mode management unit 25 is configured to manage the current network operation mode of the mobile station UE under the control of the radio network controller RNC.

The signal process unit 26 is configured to perform a predetermined process on signals transmitted or received via the interfaces 21 to 23.

For example, when detecting that the failure occurs in the SGSN or the load of the SGSN crosses the predetermined threshold, the signal process unit 26 is configured to broadcast an access restriction signal for the SGSN to the mobile station UE under the control of the radio network controller RNC via the UE interface 23.

When detecting that the failure is recovered in the SGSN or the load of the SGSN become smaller than the predetermined threshold, the signal process unit 26 is configured to broadcast an access restriction release signal for the SGSN to the mobile station UE under the control of the radio network controller RNC via the UE interface 23.

When detecting that the failure occurs in the MSC/VLR or the load of the MSC/VLR crosses a predetermined threshold, the signal process unit 26 is configured to broadcast an access restriction signal for the MSC/VLR to the mobile station UE under the control of the radio network controller RNC via the UE interface 23.

When detecting that the failure is recovered in the MSC/VLR or the load of the MSC/VLR become smaller than the predetermined threshold, the signal process unit 26 is configured to broadcast an access restriction release signal for the MSC/VLR to the mobile station UE under the control of the radio network controller RNC via the UE interface 23.

The signal process unit 26 is configured to transfer a location registration related signal which is transmitted from the mobile station UE under the control of the radio network controller RNC via the UE interface 23, to the SGSN interface 21 or the MSC/VLR interface 22.

The signal process unit 26 is configured to determine a network operation mode of the mobile station UE under the control of the radio network controller RNC, in accordance with a predetermined criterion, and to transmit a notification signal, which includes information on the determined network operation mode, to the mobile station UE via the UE interface 23.

When detecting that the failure occurs in the SGSN or the load of the SGSN crosses the predetermined threshold, the signal process unit 26 may determine to change the network operation mode of the mobile station UE under the control of the radio network controller RNC to the Network Operation Mode II.

When detecting that the failure is recovered in the SGSN or the load of the SGSN become smaller than the predetermined threshold, the signal process unit 26 may determine to change the network operation mode of the mobile station UE under the control of the radio network controller RNC to the Network Operation Mode I.

Figure 5:
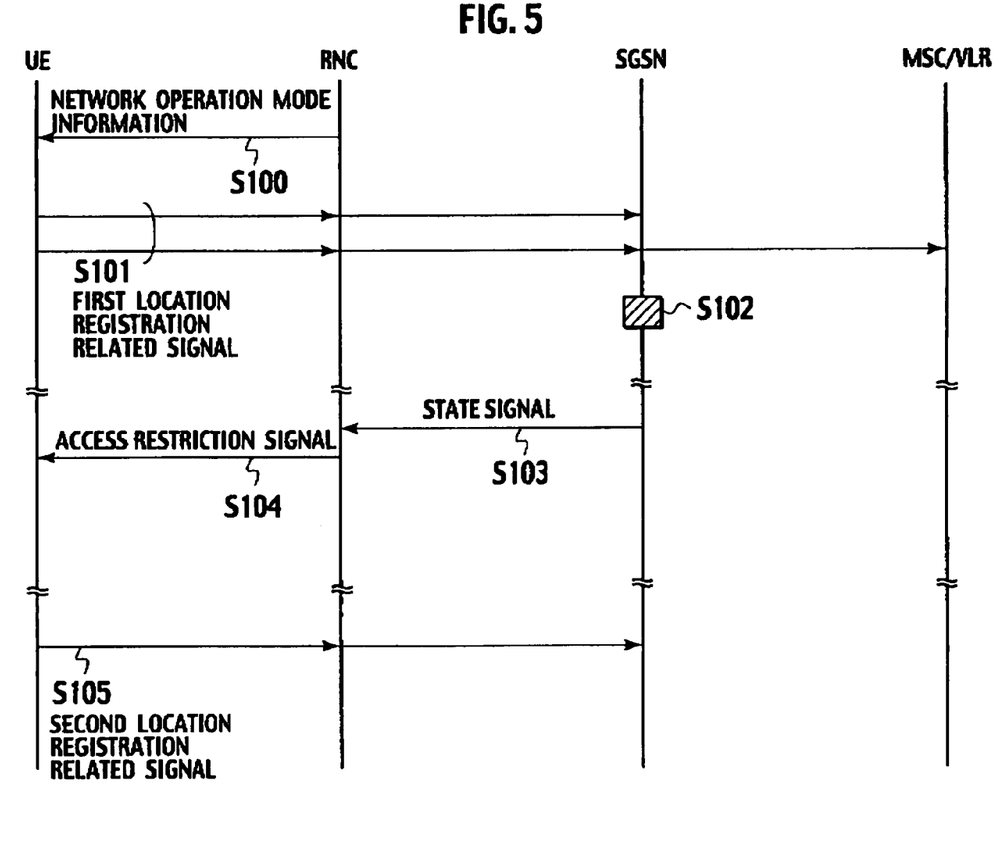
FIG. 5 is a sequence diagram showing an operation of a mobile communication system according to the embodiment of the present invention.
Figure 6:
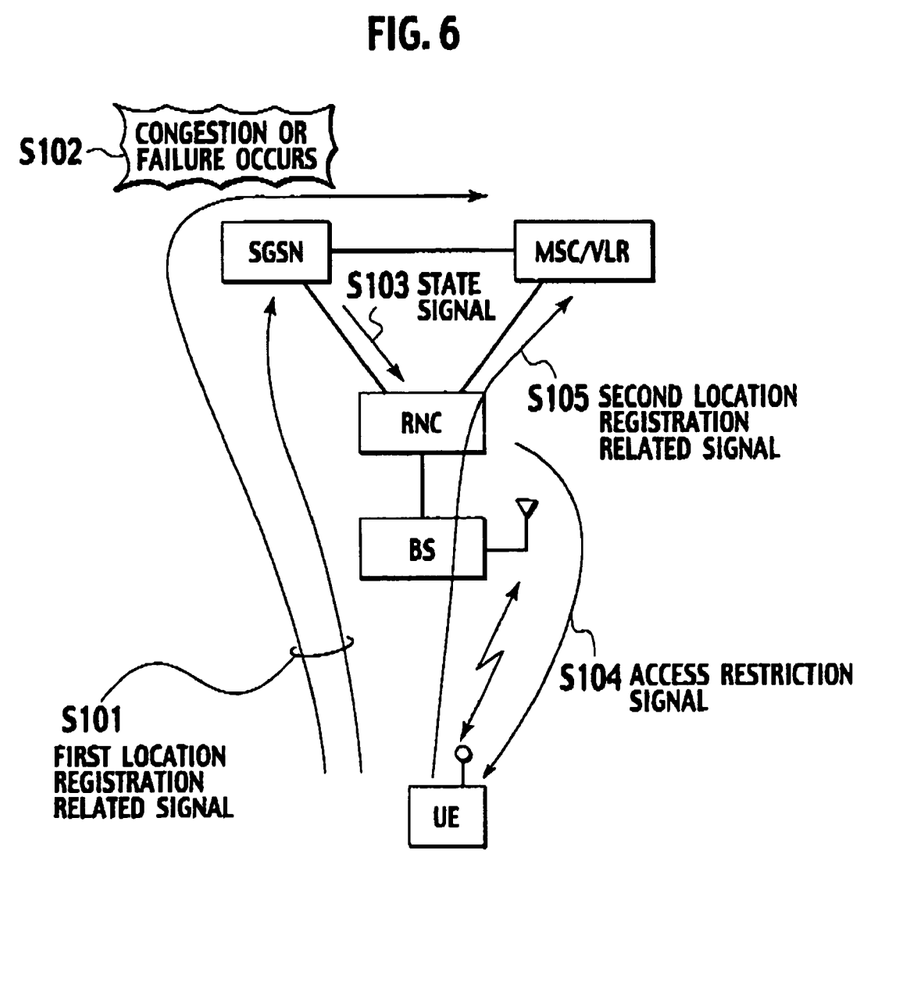
FIG. 6 is a diagram showing an operation of the mobile communication system according to the embodiment of the present invention.

Operation of the Mobile Communication System According to the Present Embodiment Referring to FIGS. 5 and 6, an operation of the mobile communication system according to the present embodiment will be described.

In step S100, the radio network controller RNC transmits a notification signal including network operation mode information, which indicates the Network Operation Mode I, to the mobile station UE under the control of the radio network controller RNC.

In step S101, the mobile station UE operates in the Network Operation Mode I, and transmits a first location registration related signal to the radio network controller RNC. The radio network controller RNC transfers the received first location registration related signal to the SGSN.

The SGSN performs location registration of the mobile station UE for a packet switched service, in accordance with the received first location registration related signal, and transfers the received first location registration related signal to the MSC/VLR.

The MSC/VLR performs the location registration of the mobile station UE for a circuit switched service, in accordance with the received first location registration related signal.

In step S102, congestion or failure occurs in the SGSN. In step S103, the SGSN transmits a state signal to the radio network controller RNC, so as to notify the occurrence of the congestion or failure.

In step S104, the radio network controller RNC detects the congestion or failure in the SGSN in accordance with the state signal from the SGSN, and broadcasts an access restriction signal for the SGSN to the mobile station UE.

In step S105, the mobile station UE transmits a second location registration related signal to the radio network controller RNC for location registration to the MSC/VLR.

In the present embodiment, the first exchange is described as an SGSN and the second exchange is described as an MSC/VLR. However, the present invention should not be limited by this explanation, and the first exchange may be an MSC/VLR and the second exchange may be an SGSN.

Operation and Effect of the Mobile Communication System According to the Present Embodiment According to the mobile communication system of the present embodiment, a mobile station UE which is operating in the Network Operation Mode I can perform the location registration or the service related process to the originally available MSC/VLR, when congestion or failure occurs in the SGSN.

As described above, the present invention can provide a mobile communication system in which a mobile station UE operating in the Network Operation Mode I can perform the location registration or service related process to the originally available MSC/VLR when congestion or failure occurs in the SGSN. Also, the present invention can provide a mobile station UE which can be used in the mobile communication system.

Additional advantages and modifications will readily occur to those skilled in the art. Therefore, the invention in its broader aspects is not limited to the specific details and the representative embodiment shown and described herein. Accordingly, various modifications may be made without departing from the scope of the general inventive concept as defined by the appended claims and their equivalents.

What is claimed is:

1. A mobile station, comprising:
    a controller configured to transmit a first location registration signal addressed to a first exchange to a radio network controller to perform location registration to both the first exchange and a second exchange, when operating in first network operation mode;
    the controller is further configured to transmit a second location registration related signal addressed to the second exchange to the radio network controller to perform location registration to the second exchange without passing thorough the first exchange, when the mobile station operates in the first network operation mode and when the mobile station receives an access restriction signal for the first exchange from the radio network controller,
    wherein the first location registration signal addressed to the first exchange includes at least one of a location registration update signal for both exchanges, an attach signal for both exchanges, or a detach signal for both exchanges.

2. The mobile station according to claim 1, wherein the controller is configured to transmit the first location registration signal addressed to the first exchange to the radio network controller to perform the location registration to both the first exchange and the second exchange, when the mobile station operates in the first network operation mode and when the mobile station receives an access-restriction release signal for the first exchange from the radio network controller.

3. The mobile station according to claim 1, wherein the first exchange is an exchange for a packet switched service;
    the second exchange is an exchange for a circuit switched service;
    the first location registration related signal includes at least one of a location registration update signal for both services, an attach signal for both services, or a detach signal for both services; and
    the second location registration related signal includes at least one of a location registration update signal for the circuit switched service, an attach signal for the circuit switched service, or a detach signal for the circuit switched service.

4. A mobile station, comprising:
    a controller configured to transmit a first service related signal addressed to a first exchange or a second service related signal addressed to a second exchange to a radio network controller to use a predetermined service; and
    the controller configured to receive an access restriction signal for either the first or second exchange from the network controller and to transmit the service related signal addressed to an exchange, which is different from the exchange notified by the received access restriction signal, to the radio network controller, to use the predetermined service,
    wherein the first service related signal or the second service related signal include at least one of a location registration update signal for both exchanges, an attach signal for both exchanges, or a detach signal for both exchanges.

5. A mobile communication method, comprising:
    transmitting a first location registration signal addressed to a first exchange to a radio network controller to perform location registration to both the first exchange and a second exchange, when the mobile station operates in a first network operation mode;
    starting, at the mobile station, to operate in the first network operation mode in accordance with a notification signal from the radio network controller; broadcasting, at the radio network controller, an access restriction signal for the first exchange to the mobile station when detecting failure or congestion in the first exchange; and
    transmitting, at the mobile station, a second location registration related signal addressed to the second exchange to the radio network controller in accordance with the access restriction signal for the first exchange to perform the location registration to the second exchange without passing through the first exchange,
    wherein the first location registration signal addressed to the first exchange includes at least one of a location registration update signal for both exchanges, an attach signal for both exchanges, or a detach signal for both exchanges.

6. The mobile communication method according to claim 5, further comprising:
    broadcasting, at the radio network controller, an access restriction release signal for the first exchange to the mobile station when detecting a recovery of failure or congestion in the first exchange; and
    transmitting, at the mobile station, the first location registration related signal addressed to the first exchange to the radio network controller in accordance with the access restriction release signal for the first exchange to perform the location registration to both the first exchange and the second exchange.

* * * * *